Patented Sept. 20, 1938

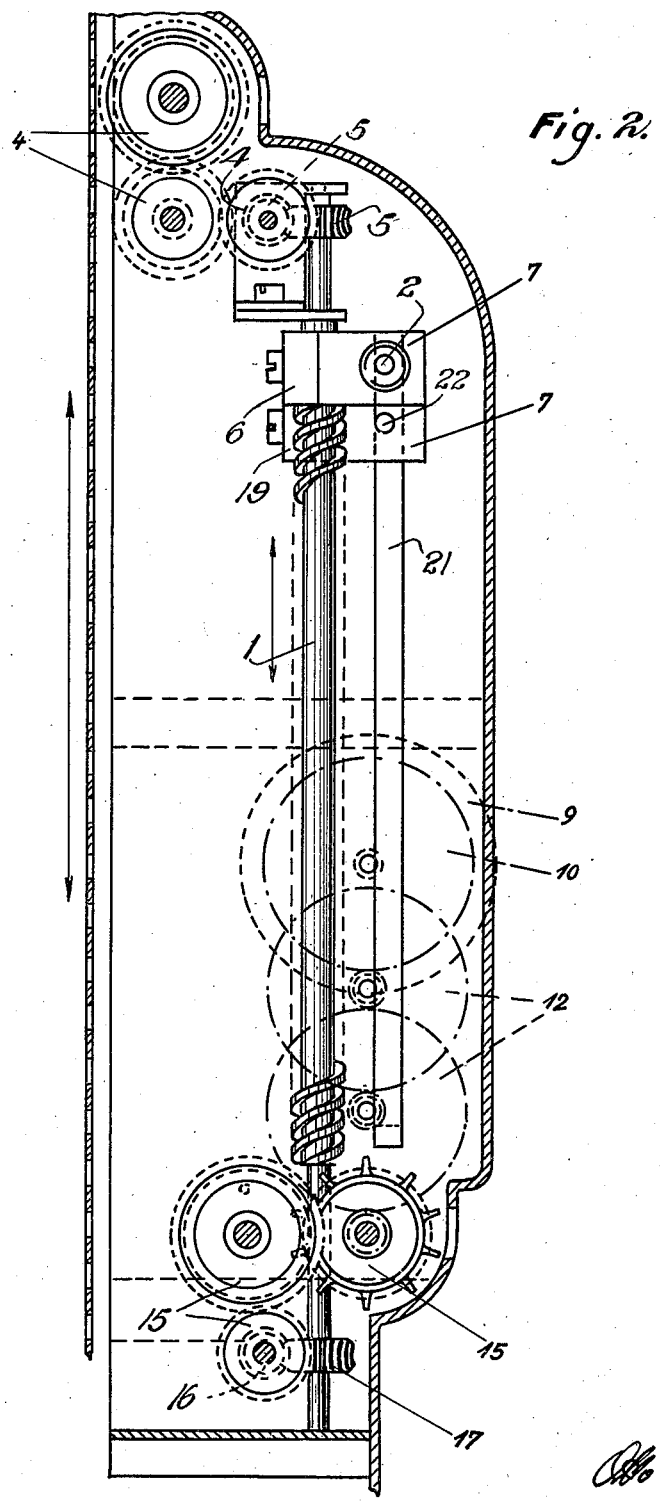

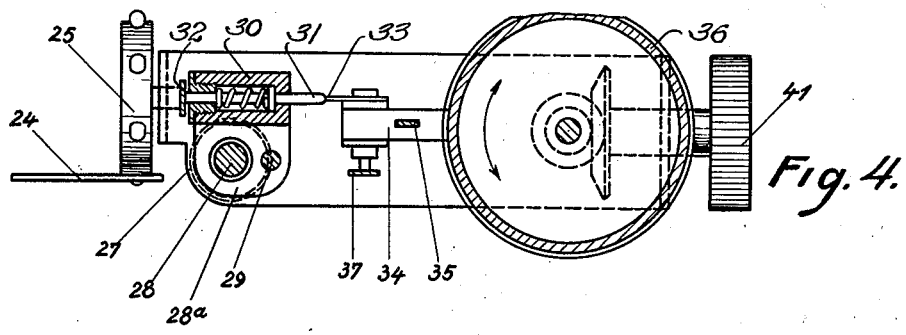
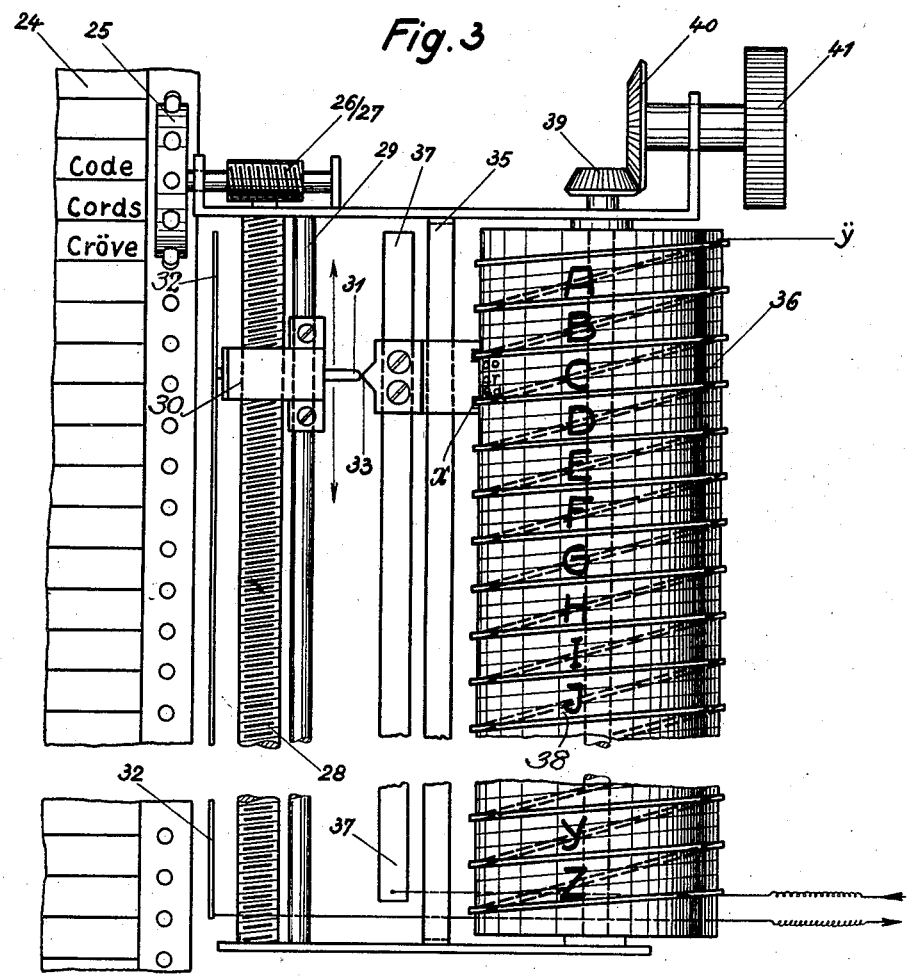

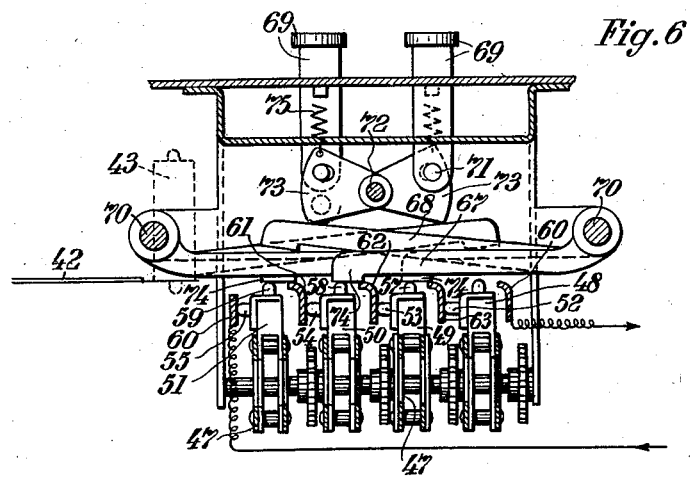
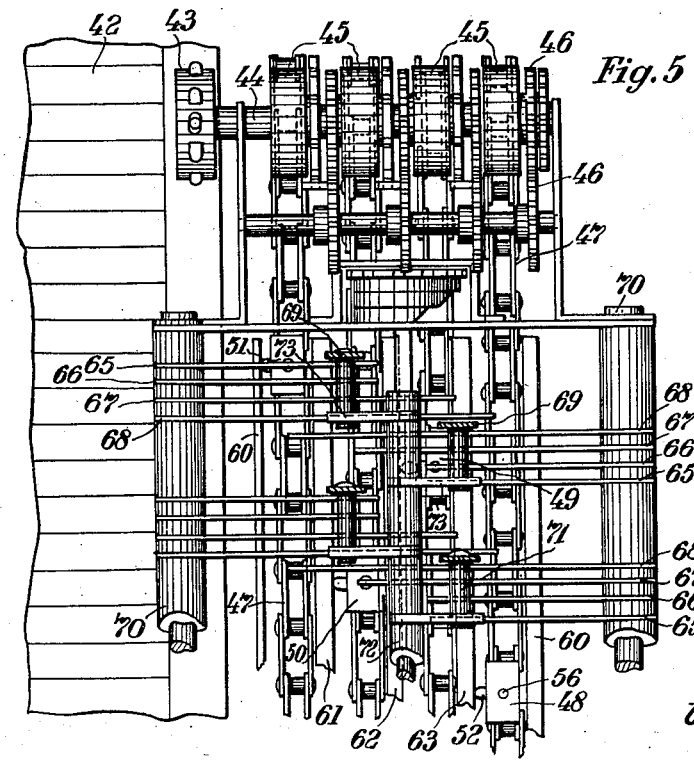

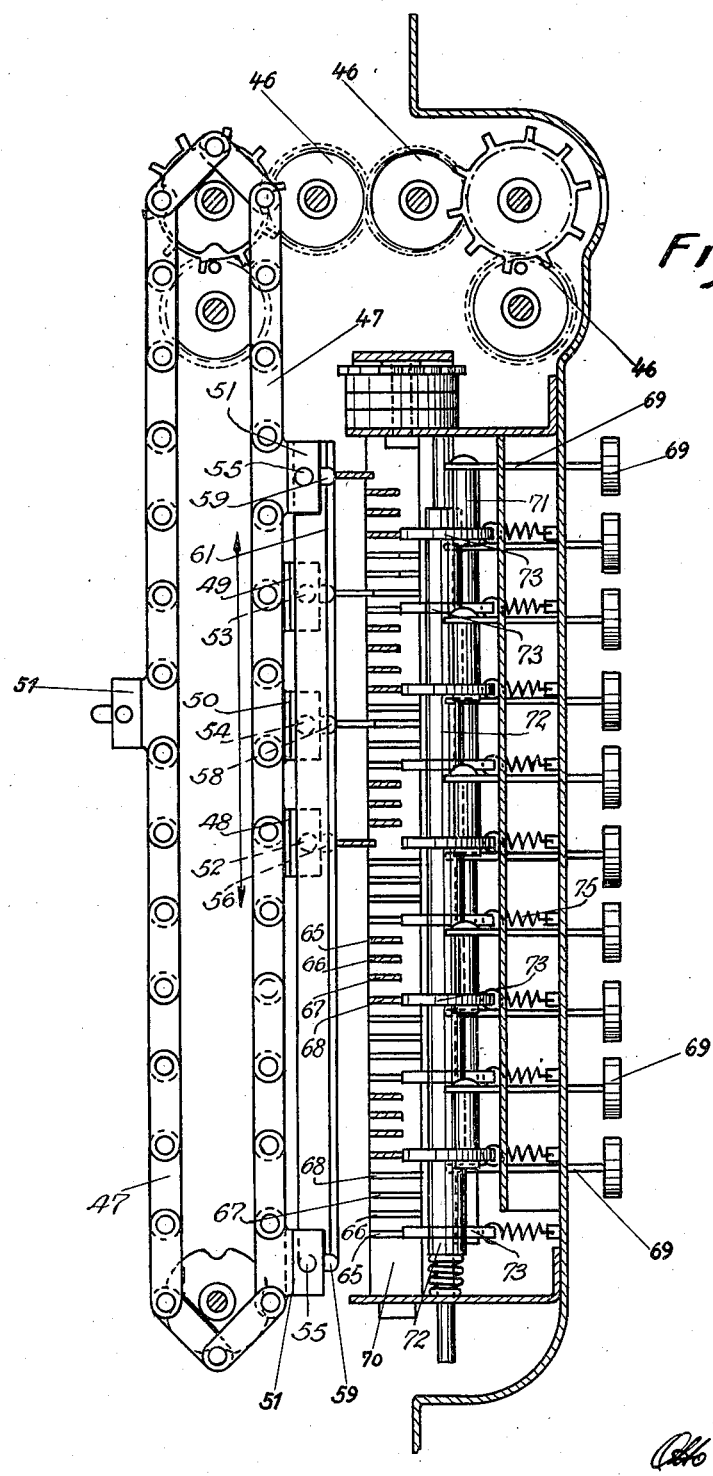

2,130,376

UNITED STATES PATENT OFFICE 2,130,376

FINDING DEVICE FOR INDEX CARDS, NOTES, OR THE LIKE ARRANGED IN OR ON CONVEYING DEVICES

Otto Alfred Becker, Saarbrucken, Germany

Application June 29, 1937, Serial No. 151,060
In Germany July 6, 1936

3 Claims. (Cl. 40—53)

This invention relates to a device for finding by electro mechanical means any desired index card, note or the like from a large number of such cards, notes or the like arranged on a band or in movable containers.

The invention is based on the idea that, for instance, the index cards or the like can be arranged in a pre-determined succession and that as a result there will be a certain distance to the beginning point or end point of the carrying band or of the successive containers in relation to, for instance, an auxiliary band. If anyhow a kind of measuring device, for instance a counting mechanism, is driven, for instance by perforation of the carrying band in connection with a sprocket wheel and actuates a spindle with a moving contact shiftable thereon, a preliminary adjustment can be carried out, for instance, by means of a device similar to the driving mechanism or by some other suitable setting device so that an electric contact is closed when the moving contact of the measuring device comes into touch with the moving contact of the setting device and the movement of the conveying band or driving gear of the containers is interrupted at the desired point, for instance by means of a braking magnet. The setting device may be arranged for markings of any kind, such as numerals, characters, words, or the like. The setting device may be constructed either as a counting mechanism or for instance as a rotary drum, and in the latter instance provided with the similar markings in accordance with the succession of the cards, articles or the like. The setting may also be effected by depressible keys. The contact will then be made not by a single key, but by a combination of keys depressed in accordance with the number of the combinations, a corresponding number of contacts being thereby closed. The finding and setting devices according to the invention need not be driven directly by the band, or in any case not by the conveying band itself, but by other elements, of for instance a driving gear, or by separate transmission devices which move in the same relation as the articles, for instance, index cards and the like are moved on the band or in containers.

The advantage of this electro-mechanical finding and setting device is the omission of any time-wasting or tedious supervision work.

The invention is applicable not only for card indexes and mechanisms therefor, but also for conveying devices of any kind. It is not necessary for a brake to be actuated, when the article looked for has been found. Any other procedure, for instance conveying in another direction may follow the finding.

In the following description several embodiments of the inventive idea will be explained, which however do not exhaust the invention.

Several embodiments of the invention are illustrated, by way of example, in the accompanying drawings in which:—

Fig. 1 shows in top plan view and

Fig. 2 in longitudinal section a setting device for numerals with direct or indirect transmission of the movement of the carrying band or of the containers.

Fig. 3 is a plan view of a modified form of construction with drum spiral setting device.

Fig. 4 is a cross section of Fig. 3.

Figs. 5, 6 and 7 illustrate an electro-mechanical setting mechanism to be actuated by depressible keys, Fig. 5 being a top plan view, Fig. 6 a part cross-sectional view of Fig. 5 and Fig. 7 a part longitudinal section of Fig. 5.

Figure 1:
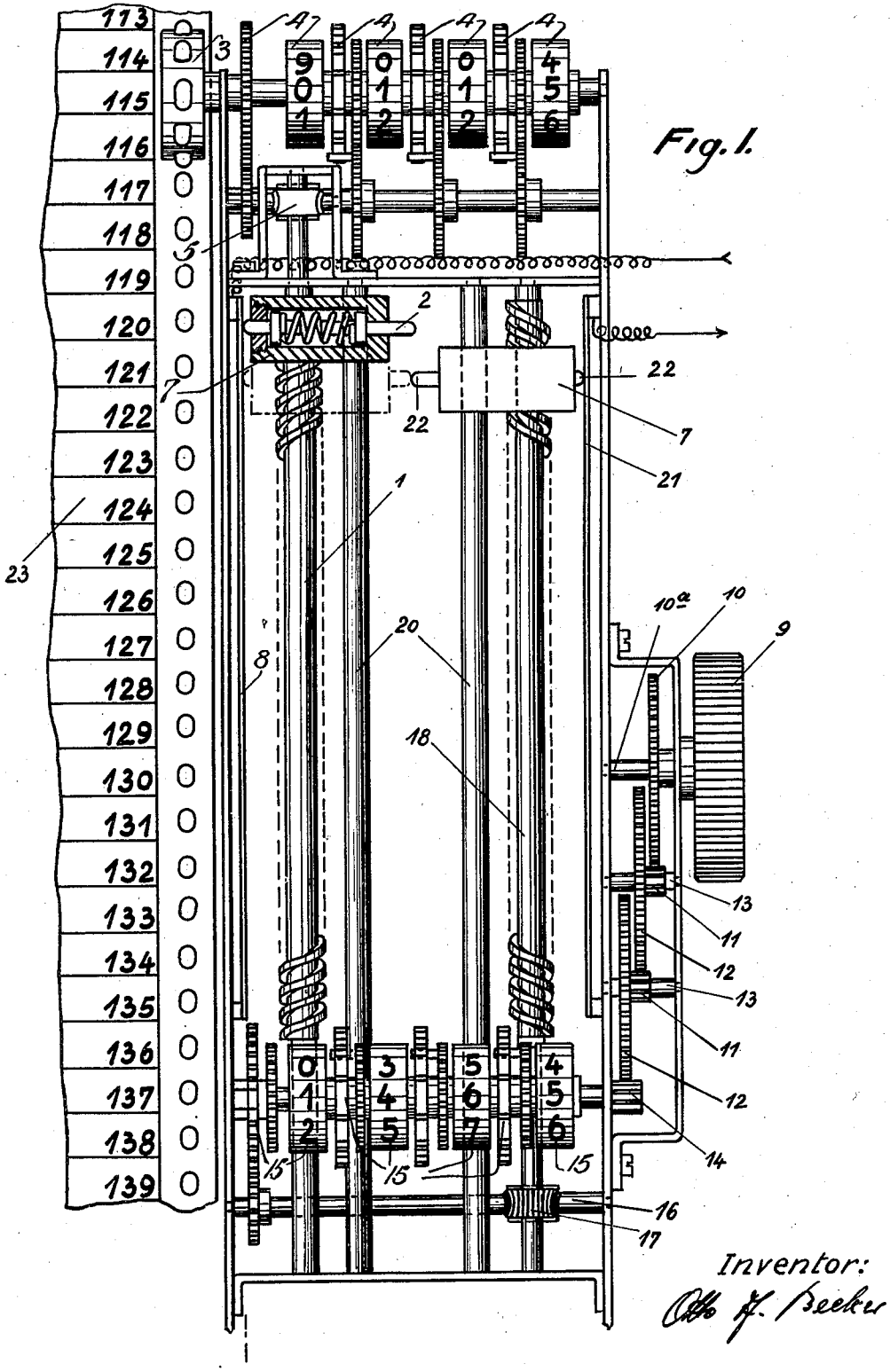

The setting device shown in Figs. 1 and 2 uses for instance numerals for the direct or indirect transmission of the movement of the carrying band or of the containers upon a spindle 1 on which a movable contact 2 is mounted. A sprocket wheel 3 is coupled with a counting mechanism 4 and also with a worm wheel 5 (Fig. 2) which actuates the screw spindle 1. A spindle nut 6 carries a spring barrel 7 made of insulating material and equipped with the runner contact 2, sliding on a conductor rail 8. A knob 9 is mounted together with a spur wheel 10 on the same axle 10a, a pinion 11 with spur wheel 12 on axle 13, a pinion 14 on the axle of the adjusting counting mechanism 15, which is connected with a worm 16 and a worm wheel 17. The worm wheel 17 (Fig. 2) is keyed on an adjusting screw spindle 18, on which a spindle nut 19 slides and is guided on a rod 20. A setting contact 22 is carried by the nut 19 and slides on a conductor rail 21.

The setting device operates in such a manner that, when the spindle 1 coordinated to the counting mechanism 4 is rotated the movable contact 2 mounted thereon moves towards the end of the spindle until it bears against the nut 19, which by the setting counting mechanism has to be moved according to the desired setting to a certain point on the finding spindle corresponding to the position of the index card on the carrying band 23, so that the circuit is closed and the brake actuated.

Fig. 3 shows a top plan view and Fig. 4 a cross-section of a finding and setting device for characters which do not lie in any uniform mutual relationship. A rolling band 24 rotates a sprocket wheel 25, which is keyed on a screw spindle 26 meshing with a worm wheel 27 arranged on a screw spindle 28. The spindle nut 28a is guided by a rod 29 and carries a spring barrel 30 made of insulating material (Fig. 4) for the moving contact 31, which slides on a conductor rail 32. A setting contact 33 is insulated on a setting slide 34, which is guided on a bar 35 and can be positively moved by a drum 36 by means of a steep pitch screw thread Y, engaging in corresponding recesses X of the moving contact, the setting slide sliding on a conductor rail 37. On the spiral drum removable script or other signs 38 are mounted in accordance with the arrangement on the carrying band 24. The spiral drum carries on its axle a bevel wheel 39 which meshes with another bevel wheel 40 rigidly connected with hand knob 41.

This setting device differs therefore from that shown in Figs. 1 and 2 by the omission of the counting mechanisms. Instead of the setting spindle a screw threaded drum is provided which admits inscription of not only the first character but also of the next following three characters of a word. The screw-threaded drum presents the advantage that on the same a band carrying the marks of the index band on a smaller scale is wound. As these marks differ as regards their local position, the setting runner will, in accordance with the proportional setting of the finding screw-threaded drum, make contact with the runner driven by the band which moves on the spindle in the same relation to the carrying band, if the two runners are accurately opposite. In this instance the desired card is in the field of vision and will be retained in this position by the released brake. The inscription on the screw-threaded drum is made in accordance with the arrangement of the index cards in exactly the same succession actually at that point of the screw threaded drum which registers with the observation-slit as soon as the card on which the entry has to be made is at the desired point in the field of vision. The setting drum thus constructed can be used for finding the individual cards, if this procedure is reversed.

A form of construction of an electro-mechanical setting mechanism, for instance for groups of numerals to be actuted by depressible keys, is illustrated in Figs. 5, 6 and 7.

The moving band 42 actuates, in known manner, a sprocket wheel 43 keyed on the axle 44 of a counting mechanism 45 of known construction. By a suitable spur-wheel gear 46 of known type four endless chain bands 47 are moved each carrying respectively a contact 48 (units), a contact 49 (tens), a contact 50 (hundreds), a contact 51 (thousands), and which are equipped with current takers 52, 53, 54, 55 and with current deliverers 56 to 59 sliding on a conductor rail 60 or on a transmission rail 61, 62, 63. A contact lever mechanism comprising four current levers 65, 66, 67, 68 for each feeler lever 69 are mounted insulated on the shafts 70 above the path of the contacts 48, 49, 50, 51. Each feeler lever 69 has a catch 71 which carries a selector 73 shiftable on a horizontal shaft 72. These feeler levers each actuate four contact levers 65, 66, 67, 68 in the succession for thousands, hundreds, tens and units. If for instance the number 314 shown on the drawings, has to be set, the 0-key is first depressed, causing the contact nose 74 on lever 65 to bear against the current transmission rack 61 which is secured in position by a suitable device. The feeler lever with the selector is then returned into its inoperative position by the spring 75 (Fig. 7) and, during the return movement of the key, the shaft 72 with the selectors 73 fixed thereon shifts automatically, for instance by the turning of a screw spindle, all selectors to the groups of hundred. By the depression of one of the hundreds keys 0—9, that is of the key with the designation 3, contact is caused between the contact lever and the conductor rail. The same occurs when the tens and units keys 1 and 4 are depressed in accordance with the selected number 314. When the carrying band 42 is unwound so far that the progressing movement of the chain bands 47 with the contacts 48 to 51 mounted thereon corresponds to the position of the number 314 of the counting mechanism, the circuit is closed by the sliding contact of the current takers 52 to 55, with the corresponding conductor rails 50 on the one hand and by nose 74 of the current transmitters 56 to 58 bearing against the transmission bar 61 on the other hand, whereby the brake for instance stops the carrying band at the desired point.

The setting of the desired card by means of a depressible key is an important advantage of this device.

I claim:—

1. In a finding device, a driving conveyor carrying the articles to be found, a setting device including two similar counting mechanisms one of said mechanisms being adjustable to a certain number combination, means for driving the second mechanism, two screw spindles each driven by one of said mechanisms, contact pieces one slidable on each of said spindles, an electric contact adapted to be closed when said contact pieces are opposite, and means for arresting said second mechanism when said contact is closed.

2. In a finding device, a driving conveyer carrying the articles to be found, a setting device including a drum, a small card index band helically wound about said drum, means for rotating said drum, a gear adapted to be shifted for the width of said band during each revolution of said drum, an indicator shiftable relatively to said drum to indicate the article selected on the conveyor, a driving mechanism connected with said setting device, and means for arresting said driving mechanism when it has run the distance determined by the setting of said setting device and the desired article is in the field of vision.

3. In a finding device, a driving conveyer carrying the articles to be found, a setting device including keys marked 0 to 9, each key comprising four contact levers covering the digits in units to thousands, a selector with shifting mechanism coordinated to each lever, circulating elements for each set of digits, a circuit connected with said keys, and contacts carried by said circulating elements and adapted to close said circuit after the selected number has been selected by said keys and arrest the movement of the conveyor with the selected article in the range of vision.

OTTO ALFRED BECKER.